Patented Sept. 23, 1924.

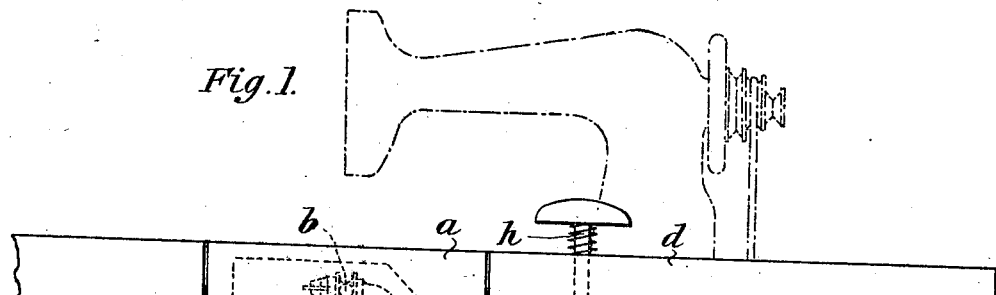
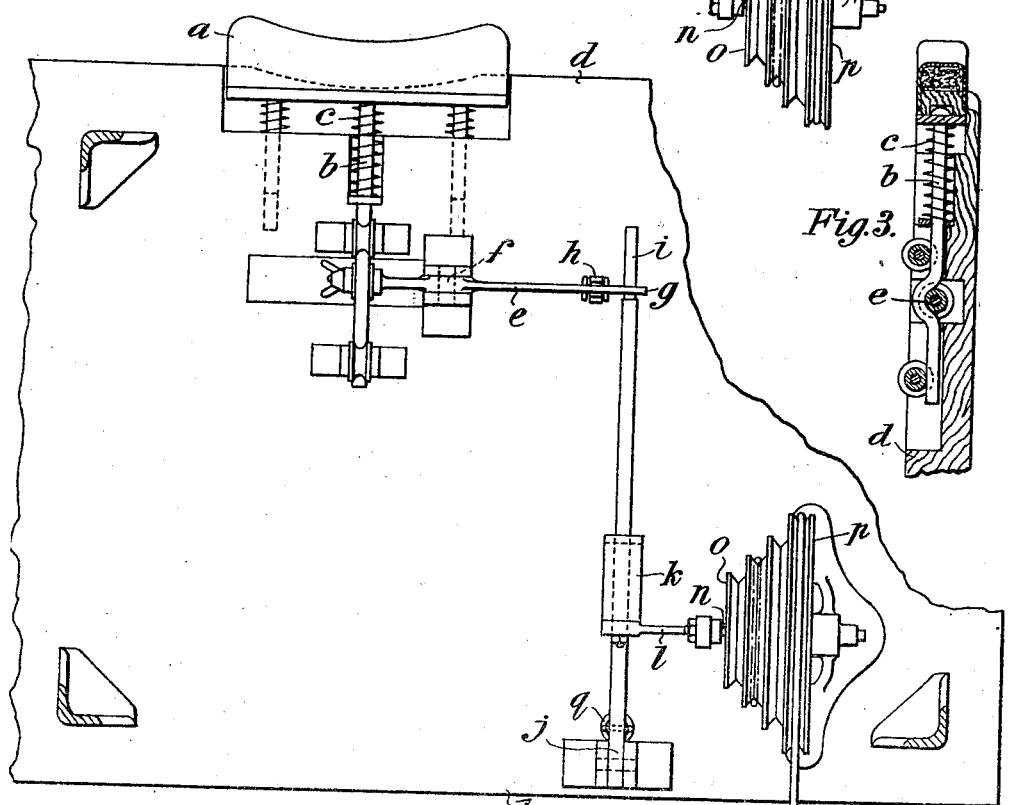

1,509,221

UNITED STATES PATENT OFFICE.

WILLIAM DAVID JAMES BAXENDALE, OF LONDON, ENGLAND.

CLUTCH-OPERATING MECHANISM.

Application filed December 9, 1919. Serial No. 343,498.

*To all whom it may concern:*

Be it known that I, WILLIAM DAVID JAMES BAXENDALE, a subject of the King of Great Britain and Ireland, residing at London, England, have invented new and useful Improvements in or Relating to Clutch-Operating Mechanism, of which the following is a specification.

My invention relates to mechanism for operating clutches used for connecting driving and driven machines and usually operated manually or by means of a pedal, and the object of my invention is to provide a means whereby such clutch mechanism may be operated by a person who has been deprived of his legs and who may at the same time employ both hands in conducting or otherwise manipulating material being machined.

According to this invention I provide a clutch operating mechanism adapted for transmitting pressure from a part of the human body adjacent the waist; or a part adjacent the elbow or from these parts together; or from either of the parts separately. To this end a body member, for example, a pad, is furnished with a waved or bent rod adapted to reciprocate in the direction of movement of the operator's body. The waved or bent part of the rod passes under one end of a lever and acts as a cam when the rod is pushed or released thus causing the said lever to oscillate about its fulcrum or pivot and so to depress or raise respectively the opposite end thereof.

To enable the operator to work the clutch with his arm near the elbow a knob is placed conveniently and which when pressed down oscillates the lever last mentioned independently or together with the body member. The end of this lever, remote from the bent rod, engages one end of an oscillating bar that is pivoted at its opposite end and this bar is straddled about mid-length by a fork carried by one end of a bell-crank lever the said fork being connected to the bell-crank lever in place of the usual connecting rod employed, for example, in connection with a pedal in motor driven sewing machines. The said bell-crank lever carries on another end a pin which, when the bell-crank lever is depressed pushes the loose belt-pulley against a friction surface between it and the constantly running driving pulley.

In a preferred embodiment of this invention in which the clutch is used for transmitting power when required from a motor to a sewing machine the following construction is described and illustrated by way of example.

In the drawings:—

Fig. 1 is a front view of the mechanism constructed according to this invention.

Fig. 2 is an underside plan view thereof and

Fig. 3 an end view, partly in section, of a detail of the machine shown in Figs. 1 and 2.

The pad $a$ is a block shaped approximately to the contour of the body at the front near the waist and may be suitably cushioned as shown, and the waved or bent rod $b$ extends at right angles inwardly from the inner part of the pad to which it is fastened and the waved or bent portion of the rod lies normally beneath a roller mounted on the lever $e$ while the rod is carried upon anti-friction rollers mounted one on each side of the lever $e$ so that when the rod $b$ is reciprocated by pressure of and released by the body relatively to the pad $a$ its bent part acts as a cam upon the lever $e$ which is thereby oscillated.

A spring $c$ between the pad $a$ and the machine table $d$ causes the return of the former when the pressure of the body is removed. The lever $e$ is pivoted between its ends at $f$, and near the end $g$ farthest from the bent rod $b$ is a stem $h$ for oscillating the lever by means of a knob pressed upon by an arm of the operator, being forked at its lower end so that it spans the said lever $e$. Between the knob of stem $h$ and the table $d$ a spring is interposed and serves to raise the knob to its inoperative position.

The end $g$ of the lever farthest from the bent rod $b$ is pierced transversely to admit the end of a bar $i$ pivoted at $j$ at its opposite end so that when the lever $e$ is oscillated it oscillates the bar $i$ in turn. The said bar $i$ passes between the prongs of a fork $k$ carried by an end of the bell-crank lever $l$ pivoted at $m$ and carrying the pin $n$ which makes contact with the loose pulley $o$ at its centre for pressing it against the friction surface between it and the fast pulley $p$. A tension-spring $q$ is placed between the pivoted bar $i$ and the table $d$ to relieve the fork $k$ and the bell crank $l$ of an operative pressure.

It will be understood that the operator, to throw the clutch into gear, presses his body against the pad $a$ and so, by moving the rod $b$, causes the bent part thereof to leave the roller at the end of the lever $e$ and in so doing to raise the said roller and with it that end of the lever the opposite end $g$ of which is thereby depressed together with that end of the pivoted bar $i$ which bar in turn depresses the fork $k$ carried by the outer end of the bell-crank $l$. This bell crank, by means of the pin $n$ at its operative end presses the fast and loose pulleys, $p$ and $o$ respectively, together so that the former drives the latter in the usual manner. Whether the pad $a$ is pressed or not the knob of the stem $h$ may be pressed upon by the arm of the operator to depress the end $g$ of the lever $e$, fork $k$ and bell-crank end for the same purpose. Thus the pad $a$ and knob stem $h$ may be used in conjunction and yet allow the operator the use of his hands.

I claim:—

1. A clutch operating mechanism, comprising a work table, a frame supported from said table, a movable clutch member co-operating with a stationary clutch member, a lever pivoted to said frame and operative upon the movable member of said clutch, an oscillating bar pivoted intermediate its ends and connected at one end to said lever, slidable means on said table operated by pressure of a part of the body above the legs for operating said bar to move the movable clutch member into operative engagement with the stationary clutch member, and means whereby said lever, said bar and said slidable means will be automatically restored to normal, and said movable clutch member will be permitted to move out of engagement with said stationary clutch member, when said pressure is removed.

2. A clutch operating mechanism, comprising a work table, a supporting frame, a movable clutch member co-operating with a stationary clutch member, a lever pivoted to said frame and operative upon the movable clutch member, an oscillating bar pivoted to said frame intermediate its ends and connected at one end to said lever, a rod slidable on said table and carrying a pad, means on said rod for oscillating said bar when pressure is applied thereto by a part of the body above the legs, and means for returning said rod to its inoperative position.

3. A clutch operating mechanism, comprising a work table, a supporting frame, a movable clutch member co-operating with a stationary clutch member, a lever pivoted to said frame and operative upon the movable member of said clutch, an oscillating bar pivoted to said frame intermediate its ends and connected at one end to said lever, a rod slidable on said table, a pad at one end of said rod adapted to receive pressure of a part of the body above the legs, an offset surface on said rod adapted, when depressed, to engage said oscillating bar and partially rotate the same about its pivot, and means for returning said rod to its inoperative position.

4. A clutch operating mechanism comprising in combination a sewing machine table, a pad to receive pressure from a part of the body near the waist, a bent rod fixed to the pad at right angles thereto and movable lengthwise, means for returning said pad to its inoperative position, a lever mounted transversely of said bent rod with one extremity arranged to engage the bent portion thereof, a knob adapted to be operated by a part of the body adjacent the elbow and mounted to slide through said sewing machine table and operate the said lever at its end remote from the bent rod portion, means for returning said knob to its normal position, an oscillating bar pivoted at one end and adapted to engage the lever at its free end, a member in engagement with said oscillating bar for transmitting movement therefrom to a device for placing the clutch surfaces in contact each with the other, substantially as herein described.

WILLIAM DAVID JAMES BAXENDALE.

Witnesses:
JOHN EDWARD TURNER,
A. T. KEARNEY.